US010830084B2

(12) United States Patent
Humhauser

(10) Patent No.: US 10,830,084 B2
(45) Date of Patent: Nov. 10, 2020

(54) HOUSING FOR A GAS TURBINE COMPRESSOR

(71) Applicant: MTU Aero Engines AG, Munich (DE)

(72) Inventor: Werner Humhauser, Moosburg (DE)

(73) Assignee: MTU Aero Engines AG, Munich (DE)

( * ) Notice: Subject to any disclaimer, the term of this patent is extended or adjusted under 35 U.S.C. 154(b) by 112 days.

(21) Appl. No.: 16/129,401

(22) Filed: Sep. 12, 2018

(65) Prior Publication Data

US 2019/0101017 A1    Apr. 4, 2019

(30) Foreign Application Priority Data

Sep. 13, 2017  (DE) .................. 10 2017 216 119

(51) Int. Cl.

| F01D 11/24 | (2006.01) |
|---|---|
| F02C 7/18 | (2006.01) |
| F02C 7/224 | (2006.01) |
| F04D 29/54 | (2006.01) |
| F01D 9/02 | (2006.01) |

(Continued)

(52) U.S. Cl.
CPC ............ *F01D 11/24* (2013.01); *F01D 9/02* (2013.01); *F01D 25/14* (2013.01); *F02C 7/14* (2013.01); *F02C 7/18* (2013.01); *F02C 7/224* (2013.01); *F04D 29/545* (2013.01); *F05D 2240/14* (2013.01); *F05D 2260/201* (2013.01); *F05D 2260/30* (2013.01)

(58) Field of Classification Search
None
See application file for complete search history.

(56) References Cited

U.S. PATENT DOCUMENTS

| 2,837,270 A * | 6/1958 | Chapman | ............... F04D 29/522 |
|---|---|---|---|
| | | | 415/17 |
| 4,329,114 A * | 5/1982 | Johnston | ................. F01D 11/24 |
| | | | 415/116 |

(Continued)

FOREIGN PATENT DOCUMENTS

| DE | 102009021384 A1 | 11/2010 |
|---|---|---|
| EP | 2604807 A2 | 6/2013 |

(Continued)

OTHER PUBLICATIONS

Takamura, Keita, JP 2009 191655 machine translation, published Aug. 27, 2009 (Year: 2009).*

*Primary Examiner* — Brian P Wolcott
*Assistant Examiner* — Jason G Davis
(74) *Attorney, Agent, or Firm* — Barlow, Josephs & Holmes, Ltd.

(57) ABSTRACT

The present invention relates to a housing for a gas turbine compressor, having an operating duct for taking up several rows of rotating blades arranged one behind the other axially, wherein a wall of the operating duct has a first air bleed, wherein the housing has a cooling passage for cooling said operating duct wall by conveying air from the first air bleed to a first outlet passage for supplying at least one first bleed air consumer, wherein the first outlet passage is arranged downstream of the first air bleed, and wherein the operating duct wall has a second air bleed downstream of the first air bleed, and the housing has a discharge passage from said second air bleed to a second outlet passage for supplying at least one bleed air consumer.

15 Claims, 3 Drawing Sheets

(51) Int. Cl.
    *F01D 25/14*     (2006.01)
    *F02C 7/14*     (2006.01)

(56) References Cited

U.S. PATENT DOCUMENTS

| | | | | |
|---|---|---|---|---|
| 5,160,241 A | * | 11/1992 | Glynn | F01D 9/06 |
| | | | | 415/116 |
| 5,351,478 A | * | 10/1994 | Walker | F01D 25/26 |
| | | | | 415/144 |
| 5,611,197 A | * | 3/1997 | Bunker | F02C 7/185 |
| | | | | 415/115 |
| 9,341,074 B2 | | 5/2016 | Schimmels et al. | |
| 9,347,334 B2 | | 5/2016 | Joe et al. | |
| 9,458,855 B2 | * | 10/2016 | Dierksmeier | F01D 11/24 |
| 9,598,974 B2 | | 3/2017 | Gekht et al. | |
| 2005/0050901 A1 | | 3/2005 | Little | |
| 2011/0135456 A1 | | 6/2011 | Takahashi et al. | |
| 2016/0348587 A1 | | 12/2016 | Banhos et al. | |
| 2017/0044924 A1 | | 2/2017 | Szarvasy | |
| 2017/0114667 A1 | | 4/2017 | Sabo et al. | |

FOREIGN PATENT DOCUMENTS

| | | |
|---|---|---|
| EP | 2381069 B1 | 3/2016 |
| EP | 2993307 A1 | 3/2016 |
| EP | 3075985 A1 | 10/2016 |
| EP | 3112607 A1 | 1/2017 |
| GB | 2267312 A | 12/1993 |
| JP | H0754669 A | 2/1995 |
| JP | 2009191655 A | 8/2009 |
| WO | 2014100164 A1 | 6/2014 |
| WO | 2015153171 A1 | 10/2015 |

\* cited by examiner

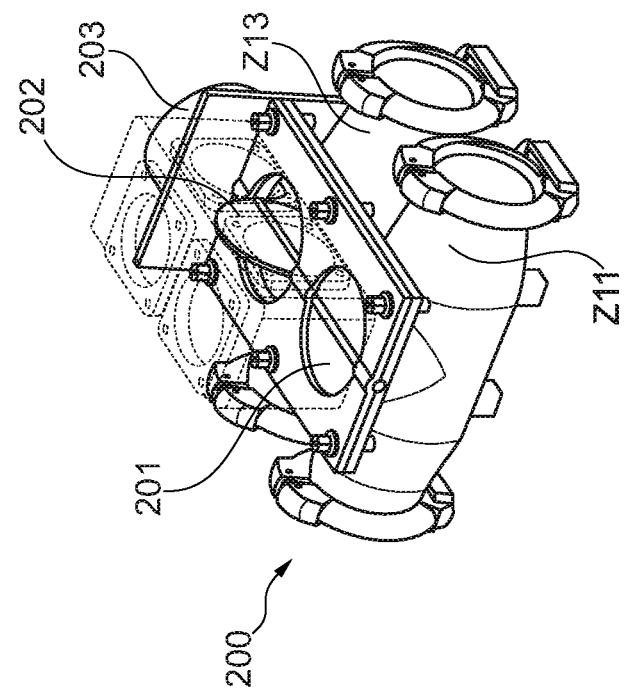
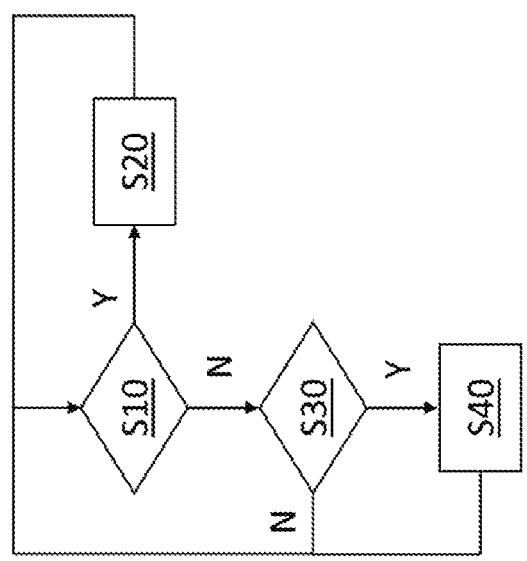

HOUSING FOR A GAS TURBINE COMPRESSOR

BACKGROUND OF THE INVENTION

The present invention relates to a housing for a gas turbine compressor, a compressor, and a gas turbine having the housing, as well as a method for operating the gas turbine.

Gas turbine compressors have a housing with an operating duct, in which several rows of rotating blades or bladed rotors are arranged one behind the other axially, in order to compress air in the operating duct and to supply it to a combustion chamber.

A radial gap is formed between rows of rotating blades and a radially outer operating duct wall, this gap being able to vary during operation due to thermal conditions. An enlargement of the radial gap, particularly a thermally caused enlargement during operation and/or a radial gap that is dimensioned or maintained structurally large in order to avoid a brushing or rubbing together under different operating conditions is a detriment to the efficiency of the compressor or of the gas turbine.

SUMMARY OF THE INVENTION

An object of an embodiment of the present invention is to improve a gas turbine and/or the operation thereof.

This object is achieved by a housing for a gas turbine compressor and a method of the present invention. A compressor and a gas turbine having a housing made in accordance with the present invention are described below. Advantageous embodiments of the invention are also discussed in detail below.

According to one embodiment of the present invention, a housing for a compressor, particularly a housing of a compressor, for a gas turbine, particularly of a gas turbine, particularly for an aircraft engine, particularly of an aircraft engine, has an operating duct in which several rows of rotating blades or bladed rotors with rotating blades (referred to a (principal) machine axis or axis of rotation of the compressor) are arranged one behind the other axially, and said housing is provided, particularly adapted, for this purpose and for accommodating these rows of rotating blades.

In one embodiment, the housing is formed of multiple parts, in particular, segmented axially; in one embodiment, it has axial segments bolted or screwed together. In this way, in one embodiment, its manufacture and/or mounting can be improved.

Additionally or alternatively, in one embodiment, the compressor is a medium-pressure or high-pressure compressor, which is arranged downstream behind or after another compressor. In the case of such compressors, the present invention can be used with particular advantage due to the pressure and temperature conditions prevailing therein.

According to one embodiment of the present invention a wall of the operating duct, in particular a radially outer wall, has a first air bleed, wherein the housing has a single-channel or a multi-channel cooling passage and/or a cooling passage formed integrally with or through the housing itself, particularly at least in sections, said cooling passage conveying air from the first air bleed to a first outlet passage for supplying a first bleed air consumer or several first bleed air consumers, at least temporarily, in particular, selectively or switchably, and/or as a function of a (radial) gap between the operating duct wall and at least one of the rows of rotating blades, by way of which the operating duct wall is cooled or is adapted or is used for this purpose, wherein said first outlet passage is arranged downstream (from or after or behind) the first air bleed. In one embodiment, the cooling channel is arranged with, in particular at, the operating duct wall, in particular adjacent to it; in one embodiment, the cooling channel is delimited or defined, at least partially, by this wall, in particular by a surface of the operating duct wall that lies opposite to a surface of the operating duct wall delimiting or defining the operating duct.

In one embodiment, the air taken for supplying one or more bleed air consumers can be advantageously utilized thereby for cooling the operating duct wall, at least in sections and/or temporarily; and thus, in one embodiment, a radial gap between operating duct wall and row(s) of rotating blades can be reduced, in particular by the construction or in the design state, and/or temporarily during operation, and, in this way, the efficiency can be increased advantageously.

In one embodiment, a radial direction in the sense of the present invention extends, in the usual technical manner, perpendicular to the (principal) machine axis or axis of rotation and the peripheral direction or direction of rotation of the compressor, so that "radially outer" designates, in particular, a greater (radial) distance to the (principal) machine axis or axis of rotation.

In one embodiment, the cooling passage abuts the operating duct wall, at least in sections, or is (radially) adjacent thereto. Additionally or alternatively, in one embodiment, at least one, in particular at least three, row(s) of rotating blades is or are arranged between the first air bleed and the first outlet passage, or the housing is adapted for this purpose.

In this way, in one embodiment (in each case, but particularly in combination), the cooling of the operating duct wall can be improved.

According to one embodiment of the present invention, the operating duct wall has a second air bleed, which is arranged downstream (from or after) the first air bleed, and the housing has a discharge passage from said second air bleed to a second outlet passage for supplying one or more bleed air consumer(s), in particular the first bleed air consumer, or one or more of the first bleed air consumer(s), and/or one or more additional bleed air consumer(s) different therefrom. In one embodiment, the first and/or additional bleed air consumer(s) or one or more of the first and/or the additional bleed air consumer(s) is/are (in each case) a consumer remote from the gas turbine or distanced from the gas turbine, and/or can comprise, in particular can be, a blow-off, a de-icing, a bearing lock ventilation and/or a cabin or cell ventilation, or the like.

Additionally or alternatively, in one embodiment, at least one, in particular at least two, row(s) of rotating blades is or are arranged between the first air bleed and the second air bleed, or the housing is adapted for this purpose.

In this way, in one embodiment, the same or different bleed air consumers can be supplied with air of different temperatures and/or pressures.

In one embodiment, the second outlet passage is arranged upstream (from or in front of) the first outlet passage, wherein the housing has a single-channel or multi-channel feed-through or through-conveyance of the cooling passage through the discharge passage, a conveyance that is separating or separated, particularly aerodynamically, in particular at least in sections; in one embodiment, through-passage channels of the cooling passage are guided through the discharge passage or through-passage channels of the discharge passage through the cooling passage or extend through the latter.

In this way, in one embodiment, a section of the operating duct wall can also be cooled downstream (from or after) the second air bleed by air from the first air bleed or the cooling passage.

In one embodiment, this through-conveyance has a housing component with first through-passage channels open on both sides axially, and separated therefrom or sealed against them (aerodynamically), it has second through-passage channels open on both sides radially, wherein, in one enhancement, the first through-passage channels connect the first air bleed and the first outlet passage to each other, and the second through-passage channels connect together the second air bleed and the second outlet passage; in another enhancement, on the other hand, the second through-passage channels connect the first air bleed and the first outlet passage to each other, and the first through-passage channels connect together the second air bleed and the second outlet passage. In one embodiment, the housing component is made up in one piece, and/or bolted or screwed, in particular axially, to at least one adjacent—in particular axially adjacent—additional housing component, and/or the first and second through-passage channels are formed integrally with one another. In particular, the outer walls of the first through-passage channels can form inner walls of the second through-passage channels, and vice versa.

In this way, in one embodiment, the through-conveyance can be improved, in particular, its aerodynamic and/or thermotechnical efficiency can be increased, and/or its manufacture and/or assembly can be simplified, and/or its structural space can be reduced.

In one embodiment, the housing component forms a section of the operating duct wall. In this way, in one embodiment, the through-conveyance can be (further) improved, and/or manufacture, assembly, and/or structural space of the housing can be improved.

In one embodiment, the housing has a return passage for air, in particular leakage air, from a region downstream (from or after) the second air bleed, in particular downstream (from or after) the most downstream row of rotating blades of the compressor, to the discharge passage, wherein the housing has a through-conveyance of the return passage through the cooling passage. In one embodiment, this through-conveyance has first through-passage channels open on both sides axially, and separated therefrom (aerodynamically) or sealed against these, it has second through-passage channels open on both sides radially, wherein, in an enhancement, the return passage has the first through-passage channels, and the second through-passage channels connect together the first air bleed and the outlet passage; in another enhancement, on the other hand, the return passage has the second through-passage channels, and the first through-passage channels connect together the first air bleed and the outlet passage.

In this way, in one embodiment, advantageously, air from downstream of the second air bleed can also be used for supplying the bleed air consumer or the bleed air consumers, which can be supplied or is/are supplied by the (air from the) second air bleed.

In one embodiment, the housing has an (additional) tapping passage for supplying the first bleed air consumer or one or more of the first bleed air consumer(s) with air from the first air bleed, wherein the tapping passage is distanced, in particular axially, from the first outlet passage; in one embodiment, it is arranged upstream (from or in front of) the first outlet passage and/or the second outlet passage.

In this way, in one embodiment, colder air from the first air bleed, air which has not flowed through the cooling passage or at least not flowed through it completely or up to the first outlet passage, can also be utilized for supplying the first bleed air consumer.

In one embodiment, the housing or the compressor has a one-part or a multi-part switching device, by which or with which an air flow through the first outlet passage and/or an air flow through the second outlet passage and/or an air flow through the tapping passage can be or will be reduced selectively, in particular blocked, in particular, for at least a temporary reduction, particularly as a function of a gap between the operating duct wall and at least one of the rows of rotating blades, or which is adapted or is used for this purpose, particularly for the alternative or complementary reduction, in particular blocking, of an air flow either through the first outlet passage or the tapping passage.

In one embodiment, the switching device can have one or a plurality of valves, particularly control valves, in particular check valves, and/or a control device for (actuating)/controlling, in particular regulating, these valves. In one embodiment, one or a plurality of valves for reducing, in particular blocking, an air flow through the first outlet passage, and one or a plurality of valves for reducing, in particular blocking, an air flow through the tapping passage, and/or one or a plurality of valves for reducing, in particular blocking, an air flow through the second outlet passage are arranged in a common housing. Additionally or alternatively, in one embodiment, at least one valve, particularly a valve member, for reducing, in particular blocking, an air flow through the first outlet passage and at least one valve, particularly a valve member, for reducing, in particular blocking, an air flow through the tapping passage are coupled together or adjustable in opposite directions.

In this way, in one embodiment, air is guided from the first air bleed selectively through the first outlet passage and/or the tapping passage to the first bleed air consumer or to the first bleed air consumers, and thus, in particular, the supply of the first bleed air consumer(s) and/or the cooling of the operating duct wall or of the gap can be adapted to different operating conditions. In one embodiment, in order to increase the cooling, more air from the first air bleed is guided through the cooling passage and the first outlet passage; in order to reduce the cooling, less air is guided through the cooling passage and the first outlet passage correspondingly, in particular, instead of more air from the first air bleed, through the tapping passage or the switching device.

In one embodiment, the cooling passage has one or more annular spaces communicating with one another; in one embodiment these spaces are axially distanced from one another. In one embodiment, additionally or alternatively, the discharge passage has one or more annular spaces communicating with one another; in one embodiment these spaces are radially distanced from one another. Additionally or alternatively, in one embodiment, the return passage has one or more annular spaces communicating with one another.

Additionally or alternatively, in one embodiment, the first air bleed and/or outlet passage (in each case) is connected to an annular space, in particular a space that is enlarged in comparison to it, and particularly bounding it. Additionally or alternatively, in one embodiment, the second air bleed and/or outlet passage (in each case) is connected to an annular space, in particular one that is enlarged in comparison to it, and particularly bounding it. Additionally or alternatively, in one embodiment, the tapping passage is connected to an annular space, in particular one that is enlarged in comparison to it, and particularly bounding it.

By way of such annular spaces, in one embodiment, the cooling of the operating duct wall and/or the air flow can be improved, in particular homogenized, and/or losses can be reduced.

Additionally or alternatively, in one embodiment, the first air bleed and/or the first outlet passage, and/or the second air bleed and/or the second outlet passage, and/or the tapping passage (in each case) have several openings distributed in the peripheral direction or a surrounding gap (in the peripheral direction); in particular, they are composed thereof. Additionally or alternatively, in one embodiment, the first air bleed and/or the second air bleed (in each case) is arranged between a row of rotating blades and an (axially) adjacent, in particular upstream or downstream, row of guide vanes having a plurality of guide vanes, in particular fixed, on the housing side and distributed in the peripheral direction.

In one embodiment, due to an arrangement of an air bleed between a row of rotating blades and a row of guide vanes, the bleed of air and/or the flow can be improved in the operating duct. In one embodiment, due to an air bleed with distributed openings, the flow in the operating duct can be improved, and the bleed of air can be improved by an air bleed having a surrounding or peripheral gap. In one embodiment, a further conveyance to the corresponding bleed air consumer or switching device can be improved by an outlet passage or a tapping passage with distributed openings.

In the sense of the present invention, a device can be designed technically by hardware and/or software, in particular, a data-associated or signal-associated—especially digital—processing unit, particularly a microprocessor unit (CPU), preferably with a memory and/or bus system, and/or can have one or a plurality of programs or program modules. The CPU can be designed for the purpose of executing commands that are implemented as a program filed in a memory system, to detect input signals from a data bus, and/or to deliver output signals to a data bus. A memory system can have one or more, in particular different, memory media, particularly optical, magnetic, solid-state and/or other nonvolatile media. The program can be created such that it incorporates the method described here and is capable of executing it, so that the CPU can execute the steps of such a method, and thus can reduce, in particular can block, an air flow through the first and/or second outlet passage and/or through the tapping passage, in particular as a function of a gap between the operating duct wall and at least one of the rows of rotating blades. In one embodiment, a computer program product can have, in particular can be, a storage medium, in particular a nonvolatile one, for storing a program or having a program stored thereon, wherein, an execution of this program initiates a system or a control, in particular a computer, for the purpose of executing a method described here or one or more of its steps.

In one embodiment, one or more, in particular all, steps of the method are conducted completely or partially automated, in particular by the devices or several devices.

BRIEF DESCRIPTION OF THE DRAWING FIGURES

Additional advantageous enhancements of the present invention can be taken from the dependent claims and the following description of preferred embodiments. For this purpose and partially schematized:

FIG. 4 shows a method for operating the gas turbine according to an embodiment of the present invention; and FIG. 5 shows a switching device in a perspective view.

DESCRIPTION OF THE INVENTION

Figure 1:
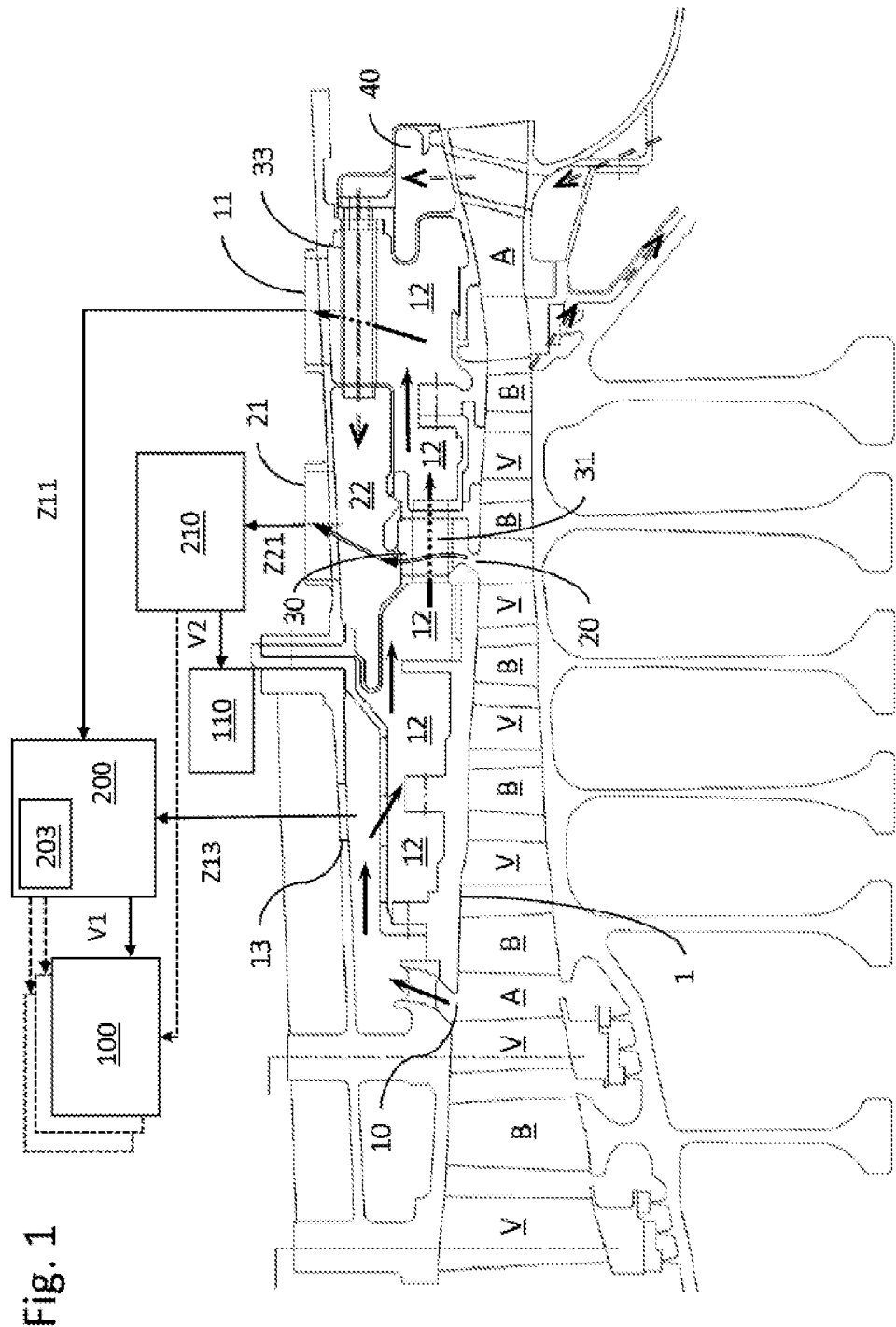
FIG. 1 shows a gas turbine compressor having a housing according to one embodiment of the present invention in a meridian half-section.
Figure 3:
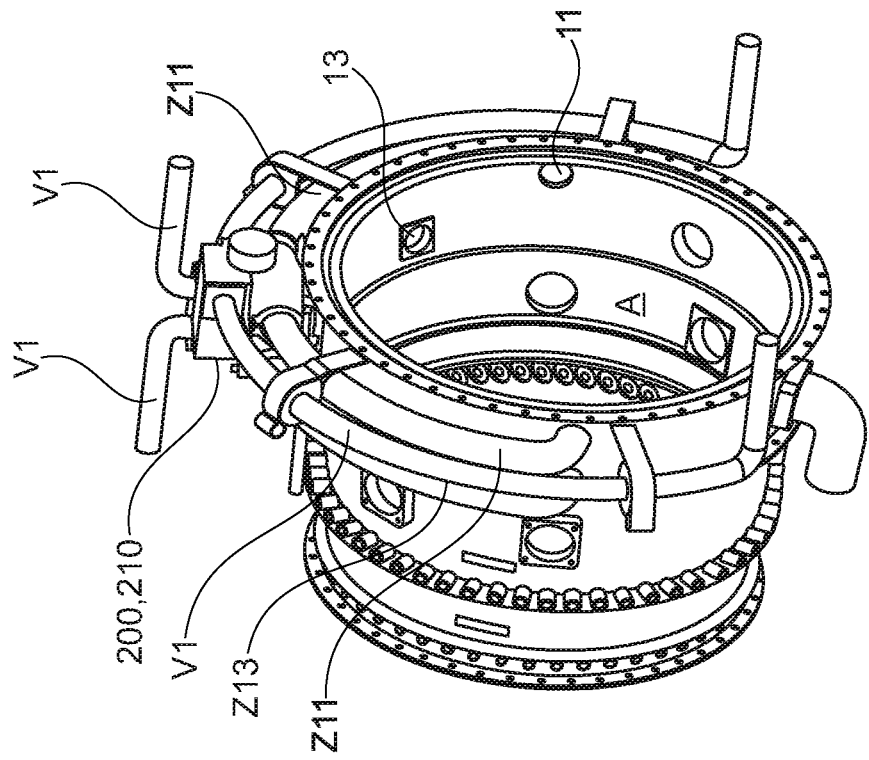
FIG. 3 shows a part of the housing in a perspective view.

FIG. 1 shows a gas turbine compressor having a housing according to one embodiment of the present invention in a meridian half-section along a (principal) machine axis or axis of rotation (horizontal in FIG. 1).

The multi-part, axially segmented housing has an operating duct A, in which several rows of rotating blades or rotating blades B are arranged one behind the other axially, between which rows of guide vanes or guide vanes V are arranged on the side of the housing.

A radially outer (top in FIG. 1) operating duct wall 1 has a first air bleed with a peripheral gap 10 and a second air bleed with a peripheral gap 20 downstream (at the right in FIG. 1) behind the first air bleed.

The housing has a first outlet passage 11 with a plurality of openings distributed in the peripheral direction for supplying a first bleed air consumer or several bleed air consumers 100, which is or are connected by lines Z11 to a switching device 200, which in turn is connected by lines V1 to the first bleed air consumer 100 or first bleed air consumers 100.

The housing additionally has a second outlet passage 21 for supplying at least one additional bleed air consumer 110 and/or the first bleed air consumer 100 or at least one of the first bleed air consumer(s) 100, said outlet passage being connected by one or more lines Z21 to a switching device 210, which in turn is connected by one or more lines V2 to the additional bleed air consumer 110 or to the additional bleed air consumers 110 or to the first bleed air consumer 100 or to the first bleed air consumers 100.

The first outlet passage 11 is arranged downstream after or behind the first and second air bleeds 10, 20 and downstream after the second outlet passage 21.

A cooling passage 12 for guiding air from the first air bleed 10 to the first outlet passage 11 in order to cool it is arranged at the operating duct wall 1. It has several annular spaces communicating with one another.

Between the second air bleed 20 and the second outlet passage 21, the housing has a discharge passage 22 for guiding air (double line in FIG. 1) from the second air bleed 20 to the second outlet passage 21, which also has annular spaces communicating with one another.

Figure 2:
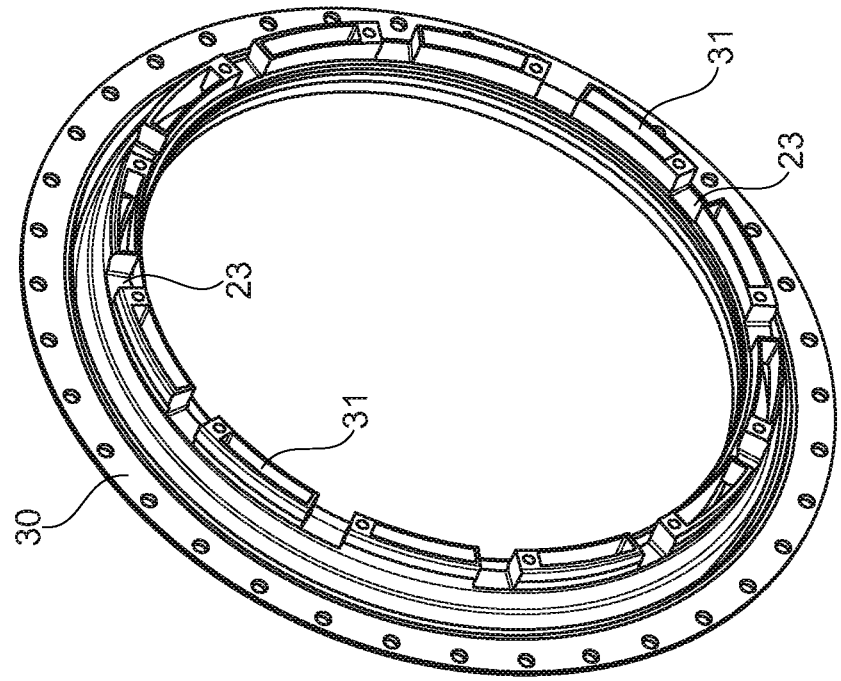
FIG. 2 shows a component of the housing in a perspective view.

The housing has a one-part housing component 30, which is shown in FIG. 2 in a perspective view and is axially screwed or bolted to adjacent housing components, the annular spaces of the cooling passage 12 connect to first through-passage channels 31 open on both sides axially, and formed integrally therewith; but, separated aerodynamically from these, the housing has second through-passage channels 23 that are open on both sides radially, these channels 23 connecting to an annular space bounding the second air bleed 20 and an annular space of the discharge passage 22 bounding the second outlet passage 21 (bottom or top in FIG. 1). Consequently, outer walls of the first through-passage channels form inner walls of the second through-passage channels. Likewise, the housing component 30 bounds or defines the second air bleed 20 or the peripheral gap thereof upstream, and thus forms the corresponding section of the operating duct wall A.

The housing further has a return passage 40 for the feedback of leakage air, which flows out downstream behind the furthest downstream row of rotating blades (dashed double line in FIG. 1), to the discharge passage 22, wherein the housing has a conveyance for the return passage in the form of several pipe connections 33 through the cooling passage 12, these connections extending to an annular space of the cooling passage 12 bounding the first outlet passage 11.

The housing additionally has a tapping passage 13 with a plurality of openings distributed in the peripheral direction for supplying the first bleed air consumer 100 or the first bleed air consumers 100 with air from the first air bleed 10, wherein the tapping passage 13 is arranged upstream in front of the first and second outlet passages 11, 21.

The tapping passage 13 is connected by lines Z13 to the switching device 200, which is shown in FIG. 5 in perspective view.

As can be discerned in FIG. 5, the switching device 200 in the example of embodiment has two butterfly valves 201, 202 that are rigidly coupled to one another, wherein the closing of the butterfly valve 201 reduces an air flow through the lines Z11 or first outlet passage 11, while a closing of the butterfly valve 202 in the opposite direction thereto alternatively reduces an air flow through the lines Z13 or tapping passage 13.

A control device in the form of a control 203 programmed correspondingly for actuating the butterfly valves 201, 202 of the switching device 200, said control also controlling the switching device 210 in one embodiment, carries out a method for operating the gas turbine, which is explained below with reference to FIG. 4.

In a step S10, the control 203 checks whether, for temporarily reducing a radial gap between the operating duct wall 1 and one of the rows of rotating blades B, a cooling of the operating duct wall 1 should be increased, and whether the butterfly valve 202 is still not completely closed. If both of these is the case (S10: "Y"), in a step S20, it further closes the butterfly valve 202 and returns to step S10.

If this is not the case (S10: "N"), in a step S30, the control 203 checks whether, for temporarily enlarging a radial gap between the operating duct wall 1 and one of the rows of rotating blades B, a cooling of the operating duct 1 should be reduced, and whether the butterfly valve 201 is still not completely closed. If both of these is the case (S30: "Y"), in a step S40, it further closes the butterfly valve 201 and returns to step S10.

If this is not the case (S30: "N"), i.e., if the cooling of the operating duct wall 1 should neither be increased nor reduced, or if this is not possible, since the corresponding butterfly valve is already completely closed, the control 203 or the method returns to step S10, without adjusting the butterfly valves 201, 202.

It is recognized that, on the one hand, by temporary closure of the butterfly valve 202 or of the tapping passage 13 and corresponding (increased) cooling of the operating duct wall 1, the radial gap between operating duct wall 1 and row of rotating blades B can be reduced temporarily during operation. Additionally, due to the described variation in the cooling, the structurally provided or obtained radial gap described between operating duct wall 1 and row of rotating blades B can also be reduced, since the probability of brushing or rubbing together during operation can be reduced by the variation in the cooling.

Although exemplary embodiments were explained in the preceding description, it shall be noted that a plurality of modifications is possible. In addition, it shall be noted that the exemplary embodiments only involve examples that in no way shall limit the scope of protection, the applications and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

It would be appreciated by those skilled in the art that various changes and modifications can be made to the illustrated embodiments without departing from the spirit of the present invention. All such modifications and changes are intended to be covered by the appended claims.

What is claimed is:

1. A housing for a gas turbine compressor, comprising:
   an operating duct for taking up several rows of rotating blades arranged one behind the other axially;
   a wall of the operating duct having a first air bleed;
   the housing having a cooling passage for cooling the operating duct wall by conveying air from the first air bleed to a first outlet passage for supplying at least one first bleed air consumer;
   wherein the first outlet passage is arranged downstream of the first air bleed,
   wherein the operating duct wall has a second air bleed downstream of the first air bleed, and the housing has a discharge passage from said second air bleed to a second outlet passage for supplying the at least one bleed air consumer or at least one second bleed air consumer,
   wherein a first switching device is provided for selective reduction of an air flow through the first outlet passage, or through a tapping passage, as a function of a gap between the operating duct wall and at least one of the rows of rotating blades, and
   wherein the first switching device is disposed between the first air bleed and the at least one bleed air consumer, and a second switching device is disposed between the second air bleed and at least one of the at least one bleed air consumer or the at least one second bleed air consumer.

2. The housing according to claim 1, wherein the second outlet passage is arranged upstream of the first outlet passage, and the housing has a through-conveyance of the cooling passage by way of the discharge passage.

3. The housing according to claim 2, wherein the through-conveyance has a housing component with first through-passage channels open on both sides axially, and, separated therefrom, second through-passage channels open on both sides radially.

4. The housing according to claim 3, wherein the housing component forms a section of the operating duct wall.

5. The housing according to claim 1, further comprising a return passage for air from a region downstream of the second air bleed to the discharge passage, wherein the housing has a through-conveyance for the return passage through the cooling passage.

6. The housing according to claim 1, wherein said tapping passage is distanced from the first outlet passage for supplying the first bleed air consumer with air from the first air bleed, said tapping passage being arranged upstream of the first outlet passage.

7. The housing according to claim 1, wherein air for cooling the operating duct wall is temporarily or selectively conveyed from the first air bleed through the cooling passage to the first outlet passage.

8. The housing according to claim 7, wherein air is guided from the first air bleed through the cooling passage to the first outlet passage as a function of a gap between the operating duct wall and at least one of the rows of rotating blades.

9. A housing for a gas turbine compressor, comprising:
an operating duct for taking up several rows of rotating blades arranged one behind the other axially;
a wall of the operating duct having a first air bleed;
the housing having a cooling passage for cooling the operating duct wall by conveying air from the first air bleed to a first outlet passage for supplying at least one first bleed air consumer; and
a return passage for air from a region downstream of a second air bleed to the discharge passage, wherein the housing has a through-conveyance for the return passage through the cooling passage
wherein the first outlet passage is arranged downstream of the first air bleed,
wherein the operating duct wall has the second air bleed downstream of the first air bleed, and the housing has a discharge passage from said second air bleed to a second outlet passage for supplying the at least one bleed air consumer or at least one second bleed air consumer.

10. The housing according to claim 9, wherein the second outlet passage is arranged upstream of the first outlet passage, and the housing has a through-conveyance of the cooling passage by way of the discharge passage.

11. The housing according to claim 10, wherein the through-conveyance has a housing component with first through-passage channels open on both sides axially, and, separated therefrom, second through-passage channels open on both sides radially.

12. The housing according to claim 11, wherein the housing component forms a section of the operating duct wall.

13. The housing according to claim 9, further comprising a tapping passage that is distanced from the first outlet passage for supplying the first bleed air consumer with air from the first air bleed, said tapping passage being arranged upstream of the first outlet passage.

14. The housing according to claim 9, wherein air for cooling the operating duct wall is temporarily or selectively conveyed from the first air bleed through the cooling passage to the first outlet passage.

15. The housing according to claim 14, wherein air is guided from the first air bleed through the cooling passage to the first outlet passage as a function of a gap between the operating duct wall and at least one of the rows of rotating blades.

* * * * *